United States Patent
Miyata

(10) Patent No.: US 7,165,805 B2
(45) Date of Patent: Jan. 23, 2007

(54) VEHICLE FRONT BODY STRUCTURE

(75) Inventor: Daizou Miyata, Odawara (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 23 days.

(21) Appl. No.: 11/104,410

(22) Filed: Apr. 13, 2005

(65) Prior Publication Data

US 2005/0231005 A1    Oct. 20, 2005

(30) Foreign Application Priority Data

Apr. 15, 2004    (JP)    ............................ P2004-120651

(51) Int. Cl.
*B62D 25/08* (2006.01)
(52) U.S. Cl. ........................ 296/203.02; 296/187.09; 296/29
(58) Field of Classification Search ........... 296/203.01, 296/203.02, 29, 187.09
See application file for complete search history.

(56) References Cited

U.S. PATENT DOCUMENTS

| 5,562,329 | A | * | 10/1996 | Srock et al. ........... 296/203.01 |
| 6,095,592 | A | * | 8/2000 | Nakatani ............... 296/187.09 |
| 6,808,229 | B2 | * | 10/2004 | Yamaguchi ................. 296/204 |
| 2002/0163226 | A1 | * | 11/2002 | Shibata .................. 296/203.02 |

FOREIGN PATENT DOCUMENTS

JP    4-81370    3/1992

* cited by examiner

*Primary Examiner*—Dennis H. Pedder
(74) *Attorney, Agent, or Firm*—McDermott Will & Emery LLP

(57) ABSTRACT

A vehicle front body structure which includes: a front side member and an extension member connected at a front end portion thereof to a rear end of the front side member and extended rearward therefrom. The front end of the extension member cooperates with a dash panel to form a box section member extending along a front surface of the dash panel. The front end of the extension member is formed to provide a closed end of the box section member.

1 Claim, 2 Drawing Sheets

VEHICLE FRONT BODY STRUCTURE

BACKGROUND OF THE INVENTION

1. Field of the Invention

The present invention relates to a vehicle front body structure of a vehicle, and particularly to the structure of a connection portion between frame members extending in the vehicle longitudinal direction, which are a front side member and a front side member extension (extension member) connected thereto.

2. Description of Related Art

The front side member and the front side member extension are connected to each other on a front surface of a dash panel and cooperates to form a frame member extending in the vehicle longitudinal direction of the vehicle front body.

Japanese Patent Publication No. 2605458 discloses a front side member extension which has a front end portion thereof extending on the front surface of the dash panel. The front end portion has a bottom wall, a front wall, and left and right side walls, constituting a substantially hat-shaped section thereof open upward.

SUMMARY OF THE INVENTION

In the above vehicle front body structure, a rear end of the front side member is connected to the front end portion of the front side member extension. However, since the front end portion of the front side member extension has the upwardly open section, the strength/rigidity thereof is low. Therefore, the strength/rigidity of the connection portion between the front end portion of the front side member extension and the dash panel, and that of the connection portion between the front side member and the dash panel become insufficient. Increasing wall thickness of the front side member extension or provision of a reinforcing member to the connection portion may be a measure to increase the rigidity thereof, however, these may result in increases in costs and weight.

An object of the present invention is to provide a vehicle front body structure in which the strength/rigidity of a connection portion between a front end portion of a front side member extension and a front surface of a dash panel is improved, and that of a connection portion between the front side member and the front side member extension is improved, without increasing in wall thickness or an additional reinforcement member.

An aspect of the present invention is a vehicle front body structure comprising: a front side member; and an extension member connected at a front end portion thereof to a rear end of the front side member and extended rearward therefrom, wherein the front end portion of the extension member cooperates with a dash panel to form a box section member extending along a front surface of the dash panel, wherein the front end portion of the extension member is formed to provide a closed end of the box section member.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
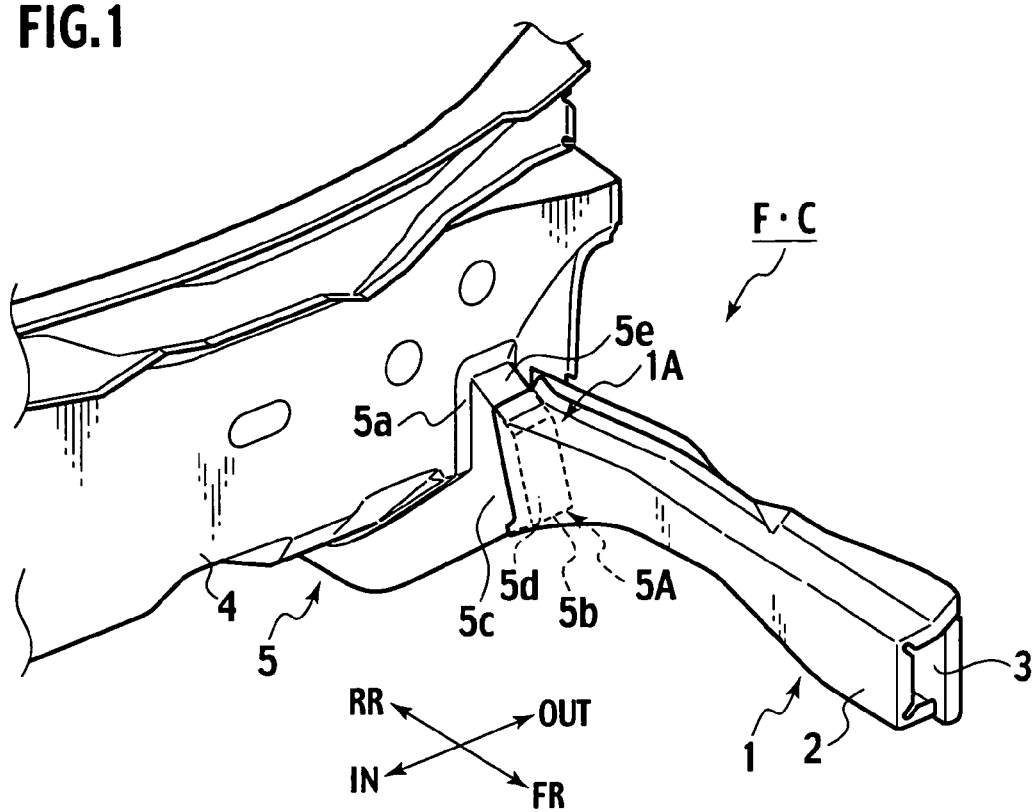
FIG. 1 is a perspective view of a front side member and a front side member extension according to an embodiment of the present invention.

An embodiment of the present invention will be explained below with reference to the drawings, wherein like members are designated by like reference characters.

Figure 2:
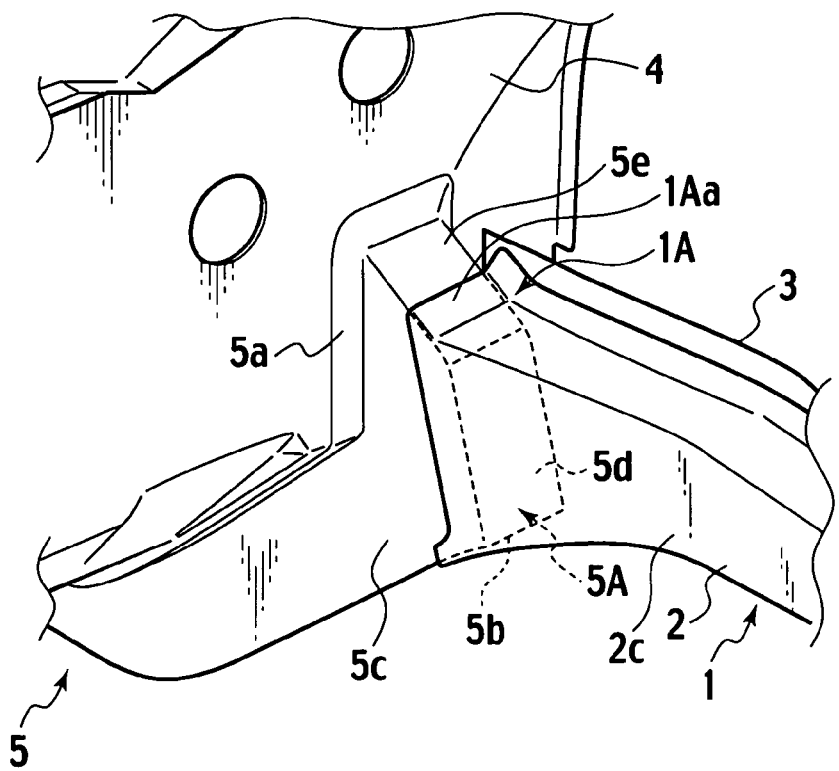
FIG. 2 is an enlarged perspective view of a main part of the structure in FIG. 1.
Figure 3:
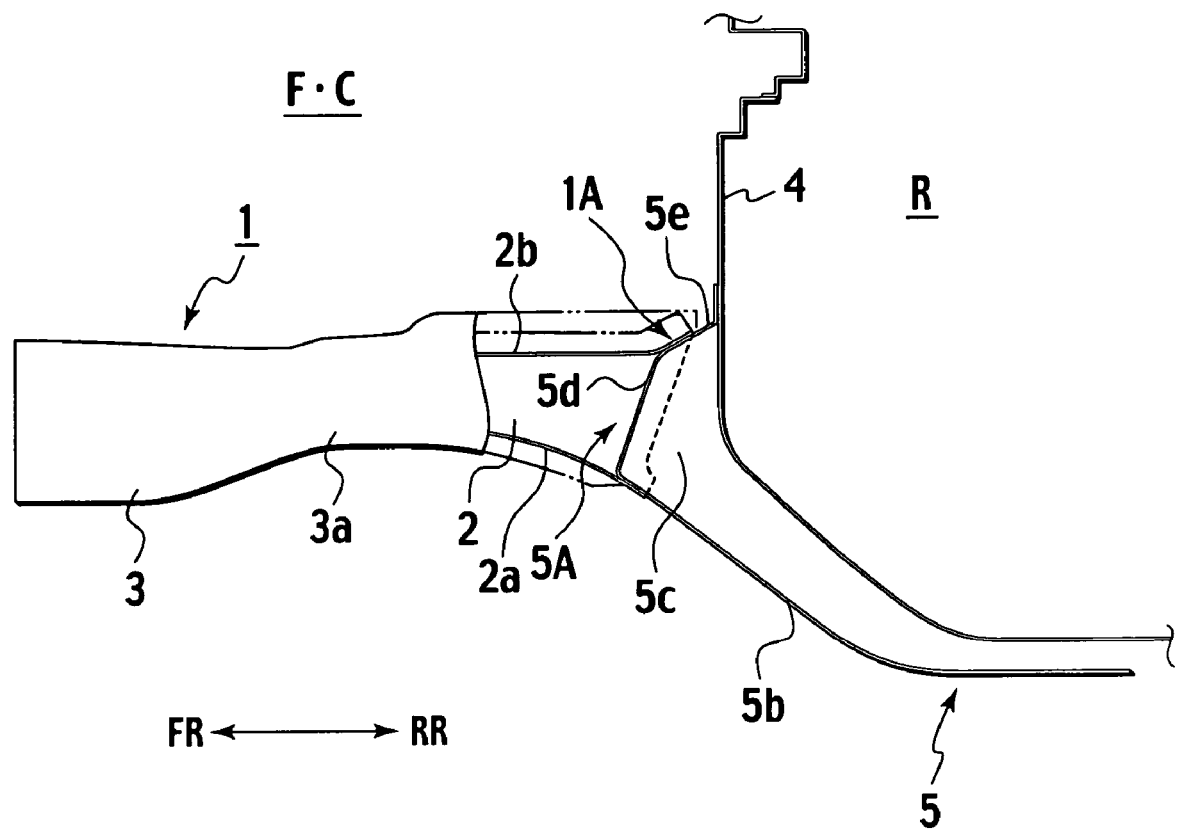
FIG. 3 is a partially sectional side view of the structure in FIG. 1.

In the vehicle front body structure of this embodiment, a pair of front side members 1 extending in the vehicle longitudinal direction are disposed on both sides in the vehicle transverse direction of vehicle front compartment F/C, as shown in FIGS. 1 to 3.

The front side member 1 is a structural frame member having a rectangular closed section, which is constituted of an inner panel 2 having a substantially hat-shaped section open outward in the vehicle transverse direction and an outer panel 3 connected to a transversely outer side of the inner panel 2 to cover and close the opening of the inner panel 2. The front side member 1 is connected to a front side member extension 5 at a location on a front surface of a dash panel 4 which separates a passenger compartment R and an engine compartment.

The front side member extension 5 has a substantially hat-shaped section open upward, and is provided on left and right sides of the continuous opening along the length thereof with flanges 5a extending outward in the vehicle transverse direction. The front side member extension 5 is attached to the dash panel 4 with the flanges 5a thereof fixed to both front and bottom surfaces of the dash panel 4. The front side member extension 5 thus cooperates with the dash panel 4 to form a box section member extending continuously from the front surface of the dash panel 4 to the bottom surface thereof and further rearward therefrom.

The front side member extension 5 is provided on the front end portion thereof with a bag-shaped end portion 5A which has a bottom wall 5b, transversely inner and outer side walls 5c extending upward from both left and right ends of the bottom wall 5b, a front wall 5d extending upward from the front end of the bottom wall 5b in parallel with the front surface of the dash panel 4 and connecting the inner and outer side walls 5c, and an upper wall 5e extending rearward from the upper end of the front wall 5d and closing an opening defined by the upper edges of the inner and outer side walls 5c and the front wall 5d, and the front surface of the dash panel 4.

The bag-shaped end portion 5A is provided with a flange 5a formed continuously around the upper and rear edges thereof. The bag-shaped end portion 5A is attached to the dash panel 4 with the flange 5a thereof fixed to the front surface of the dash panel 4, thus forming a closed end of the box section member.

The front side member 1 is provided at the rear end thereof with a rearward opening socket portion 1A for receiving the bag-shaped end portion 5A of the front side member extension 5. The socket portion 1A has a joint portion to be joined onto a joint portion of the bag-shaped end portion 5A. The joint portion of the socket portion 1A has an inner surface in a shape corresponding to the outer shape of the joint portion of the bag-shaped end portion 5A. The joint portion of the socket portion 1A is formed to have a larger opening area in cross section as it goes to the rear. The joint portion of the bag-shaped end portion 5A is also formed to have a larger cross sectional area as it goes to the rear. The joint portion of the socket portion 1A is provided at the rear end of the socket portion 1A to overlap on the joint portion of the bag-shaped end portion 5A. The joint portion of the socket portion 1A is a wall smoothly and continuously extended from the front portion of the front side member 1 without being bent abruptly. In other words, the socket portion 1A is formed so that when the socket portion 1A is fitted to the bag-shaped end portion 5A for connecting the rear end of the front side member 1 to the front end portion of the front side member extension 5, a bottom wall 2a, an upper wall 2b, a transversely inner side wall 2c and a transversely outer side wall 3a of the front side member 1 cooperate with the bottom wall 5b, the inner and the outer side walls 5c, and the upper wall 5e of the bag-shaped end portion 5A of the front side member extension 5, respectively, to form a frame member extending in the vehicle longitudinal direction with smooth and continuous outer surfaces.

Also, the upper wall 5e of the bag-shaped end portion 5A and an upper wall 1Aa of the socket portion 1A are both formed to be inclined forward with a slope higher in the rear. By this, the joint area between the joint portions of the bag-shaped end portion 5A and the socket portion 1A becomes larger, and the joint area between the bag-shaped end portion 5A and the front surface of the dash panel 4 is expanded in the vertical direction.

According to the vehicle front body structure of the present embodiment, since the front end portion of the front side member extension 5 has the bag-shaped end portion 5A, the rigidity of itself is high. Moreover, since the bag-shaped end portion 5A is attached to the front surface of the dash panel 4, and cooperating with the front surface of the dash panel 4, forms the box section member with its end completely closed, the strength/rigidity of the front end portion of the front side member extension 5, the connection portion between the front end portion thereof and the front surface of the dash panel 4, and the base portion of the rear end of the front side member 1 are enhanced. And the vehicle is provided with an increased buckling load or crushing load against a collision load at a frontal collision.

The enhanced rigidity of the connection portion between the front surface of the dash panel 4 and the bag-shaped end portion 5A and the base portion of the front side member 1 prevents bending deformation in the vertical direction at the base portion of the front side member 1 at the frontal collision of the vehicle. The front side member 1 is thus axially deformed from the front end, efficiently absorbing collision impact energy, whereby deformation of the dash panel 4 toward the passenger compartment R can be suppressed.

As mentioned above, only by constituting the front end portion of the front side member extension 5 as the bag-shaped end portion 5A, the strength/rigidity of itself can be improved without increasing the wall thickness or adding a reinforcing member, thus contributing to costs and weight saving.

Also, in this embodiment, since the socket portion 1A at the rear end of the front side member 1 is fitted onto the bag-shaped end portion 5A of the front side member extension 5 with the joint portions thereof joined to each other, the load inputted at the frontal collision is applied to the joint portions in the shearing direction which is advantageous for the strength thereof. Therefore, the strength/rigidity of the connection portion between the front side member 1 and the front side member extension 5 is enhanced.

Moreover, since the upper wall 5e of the bag-shaped end portion 5A and the upper wall 1Aa of the socket portion 1A to be fitted thereon are both formed to be inclined forward, the joint area between the bag-shaped end portion 5A and the socket portion 1A becomes larger, whereby the strength/rigidity at connection thereof becomes further enhanced, and the joint area between the bag-shaped end portion 5A and the front surface of the dash panel 4 is expanded, whereby the rigidity of their connection portion is further enhanced.

Furthermore, in assembly of the front side member 1 and the front side member extension 5, the inclination of the upper wall 5e of the bag-shaped end portion 5A and the upper wall of the socket portion 1A provide a guiding function which improves the workability at assembly.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2004-120651, filed on Apr. 15, 2004, the disclosure of which is expressly incorporated herein by reference in its entirety.

What is claimed is:

1. A vehicle front body structure comprising:
   a front side member; and
   an extension member connected at a front end portion thereof to a rear end of the front side member and extended rearward therefrom, wherein
   the front end portion of the extension member cooperates with a dash panel to form a box section member extending along a front surface of the dash panel, wherein
   the front end portion of the extension member comprises a bag-shaped end portion which has a bottom wall lateral side walls extending upward from right and left ends of the bottom wall, a front wall extending upward from a front end of the bottom wall, and an upper wall extending rearward from an upper end of the front wall, and
   the bag-shaped end portion cooperates with the dash panel to form a closed end of the box section member, wherein
   the front side member is formed to have at the rear end thereof, a socket portion which is to be fitted to the bag-shaped end portion of the extension member, and
   the upper wall of the bag-shaped end portion and an upper wall of the socket portion to be fitted thereon are inclined.

* * * * *